United States Patent
Gasquet et al.

(10) Patent No.: US 8,840,290 B2
(45) Date of Patent: Sep. 23, 2014

(54) OPTICAL DEVICE FOR A MOTOR VEHICLE INCLUDING A SURFACE LIGHT SOURCE

(75) Inventors: Jean-Claude Gasquet, Saint Clement (FR); Pierre Albou, Paris (FR); Christophe Dubosc, Villemomble (FR); Antoine De Lamberterie, Paris (FR); Marc Brassier, Le Perreux (FR); Vincent Godbillon, Paris (FR); Vanesa Sanchez, Paris (FR)

(73) Assignee: Valeo Vision, Bobigny (FR)

( * ) Notice: Subject to any disclaimer, the term of this patent is extended or adjusted under 35 U.S.C. 154(b) by 27 days.

(21) Appl. No.: 13/574,911

(22) PCT Filed: Jan. 10, 2011

(86) PCT No.: PCT/EP2011/050235
§ 371 (c)(1),
(2), (4) Date: Oct. 12, 2012

(87) PCT Pub. No.: WO2011/092052
PCT Pub. Date: Aug. 4, 2011

(65) Prior Publication Data
US 2013/0039087 A1    Feb. 14, 2013

(30) Foreign Application Priority Data
Jan. 26, 2010 (FR) ...................... 10 50504

(51) Int. Cl.
*F21V 5/00* (2006.01)

(52) U.S. Cl.
USPC ............................ 362/521; 362/522

(58) Field of Classification Search
USPC ......................................... 362/521
See application file for complete search history.

(56) References Cited

U.S. PATENT DOCUMENTS

| 7,645,054 | B2 | 1/2010 | Goihl |
| 2005/0117347 | A1 | 6/2005 | Melpignano et al. |
| 2008/0068852 | A1* | 3/2008 | Goihl ............................ 362/509 |
| 2011/0079772 | A1 | 4/2011 | Ben Khalifa et al. |

FOREIGN PATENT DOCUMENTS

| DE | 20207799 | 8/2002 |
| DE | 10231324 | 1/2004 |
| DE | 102007018985 | 10/2008 |
| DE | 102007018986 | 10/2008 |
| EP | 1485959 | 12/2004 |
| FR | 2926677 | 7/2009 |
| WO | 03077325 | 9/2003 |

* cited by examiner

*Primary Examiner* — Mary Ellen Bowman
(74) *Attorney, Agent, or Firm* — Jacox, Meckstroth & Jenkins (57) ABSTRACT

An optical device for a motor vehicle comprising a surface light source emitting light rays in a first direction, wherein it comprises an optical system including first deflecting optical means that are at least locally remote from the surface light source and deflecting the light rays emitted in the first direction, in a second direction different from the first direction.

20 Claims, 10 Drawing Sheets

OPTICAL DEVICE FOR A MOTOR VEHICLE INCLUDING A SURFACE LIGHT SOURCE

CROSS-REFERENCE TO RELATED APPLICATIONS

This application claims priority to PCT Application PCT/EP2011/050235 filed Jan. 10, 2011, and also to French Application No. 1050504 filed Jan. 26, 2010, which applications are incorporated herein by reference and made a part hereof.

BACKGROUND OF THE INVENTION

1. Field of the Invention

The present invention relates to an optical device, notably for a motor vehicle, such as a lighting and/or signaling device that notably has a photometric function that is useful for road travel, enabling the vehicle to be seen by other vehicles or enabling the driver of the vehicle to see outside.

2. Description of the Related Art

It is known practice, notably from the document DE 10 2007 018 985, which document is incorporated herein by reference and made a part hereof, to use surface light sources, in particular an organic light-emitting diode, as light source of a motor vehicle optical device, in the case of DE 10 2007 018 985, which document is incorporated herein by reference and made a part hereof, a motor vehicle signaling device. Although a light source of organic light-emitting diode type makes it possible to provide an extremely uniform light, it has many drawbacks:

Firstly, the organic light-emitting diodes, also called OLEDs, these days comprise small molecules, because they are more effective and better suited to producing a signaling function in a limited space, for example a rear wing of a vehicle. However, these molecules have to be protected from water and oxygen molecules, which is done using glass plates. The OLEDs used to produce a signaling function therefore comprise a protective glass plate in contact with the emitting layer. The glass plates greatly limit the possible forms of the organic light-emitting diodes. The OLEDs therefore need to have planar surfaces or at the very least regular surfaces and they cannot therefore consist of a screen that has any awkward surface as a standard lens of a lighting and/or signaling device of a motor vehicle. This therefore poses design problems.

Next, the luminance supplied by an organic light-emitting diode of current technology is not sufficient to ensure certain signaling functions (such as the "town signaling", "braking signaling" and "boosted braking signaling" signaling functions). An organic light-emitting diode of current technology typically supplies a luminance of 1000 Cd/m$^2$ whereas, to ensure the abovementioned functions, a luminance of 5000 to 10 000 Cd/m$^2$ would be needed. Nevertheless, a new organic light-emitting diode technology makes it possible to greatly increase the emission directivity of the diode in the direction perpendicular to its emitting surface. Thus, without increasing the emittance of the diode, the luminance can be greatly increased, for example by a factor of 10, to reach approximately 10 000 Cd/m$^2$. However, an organic light-emitting diode of this technology is highly directive. Consequently, it presents, in addition to the drawback mentioned previously, that of having to be oriented in the longitudinal axis of the vehicle or, more generally, in the direction in which it has to emit the light. This therefore poses design problems, notably bulk and design problems.

Consequently, the use of an organic light-emitting diode in a lighting and/or signaling device of a motor vehicle is valid only if this surface is a regular surface. It is then possible to produce a lighting or signaling device by depositing an organic light-emitting diode on a flexible substrate. The efficiency of such a technology is very low in comparison to the technologies in which the diodes are deposited on a flat glass substrate.

Also known from the document DE 10 2007 018 986, which document is incorporated herein by reference and made a part hereof, is a lighting device for a passenger compartment of a motor vehicle comprising:

an assembly of organic light-emitting diodes onto which are glued a first optical element, and a second optical element.

Also known from the documents DE 202 07 799 and EP 1 485 959, which is equivalent to U.S. Patent Publication 2005/0117347, which are incorporated herein by reference and made a part hereof, are motor vehicle signaling devices comprising an organic light-emitting diode covered by an optical element comprising a spatial repetition of a pattern in order to improve the efficiency of the diode by virtue of the fact that the rays are less easily trapped in total reflection and can thus more easily leave the transparent substrate. This technology is of interest only if the optical element is glued to the substrate, in other words if the optical element is glued onto a plane. Such signaling devices do not make it possible to resolve the problems mentioned above.

Also known from the document FR 2 926 677, which is equivalent to U.S. Patent Publication 2011/0079772, which is incorporated herein by reference and made a part hereof, is an organic light-emitting diode device emitting a light beam having a strong directivity. Such an organic light-emitting diode comprises, between its two electrodes, different layers, notably a light-emitting layer, a layer promoting the transfer of the electrons to the emitting layer and a layer promoting the transfer of the holes to the emitting layer. The assembly of these layers constitutes a microcavity whose thickness is engineered to create an optical resonance. The result of such a structure is an emission of a light beam that exhibits a strong directivity.

SUMMARY OF THE INVENTION

The aim of the invention is to provide an optical device for a motor vehicle, notably a lighting and/or signaling device that is simple and compatible with the many bulk and design constraints to which these devices are subject.

One subject of the invention is an optical device for a motor vehicle, notably a signaling and/or lighting device, comprising a surface light source emitting light rays in a first direction. The motor vehicle optical device according to the invention comprises an optical system including first deflecting optical means that are at least locally remote from the surface light source and deflecting the light rays emitted in the first direction, in a second direction different from the first direction. Thus, it is possible to overcome any light source position constraints.

The present invention also makes it possible to overcome the risks of glare to drivers when solar rays are reflected on the light source, notably when the latter is an OLED. This is because the sun's rays, after having passed through the screen, having been reflected on the OLED and having passed back through the screen, are returned in all directions and there is almost no risk of glare.

Preferentially, the optical device for a motor vehicle according to the invention has a sealed enclosure, formed by a module and a sealing lens, in which is placed the surface light source and the optical system. It may be a lighting device, such as a headlight. It may also be a signaling device, such as a rear vehicle light.

The optical system may comprise second optical means for spreading light rays. Such means make it possible to obtain a desired luminous distribution of the light rays emitted and obtain a particular aspect of the optical device for a motor vehicle according to the invention, in particular to satisfy the regulatory photometric specifications while ensuring the best uniformity.

The first and/or the second optical means may comprise a number of diopters.

One or more diopters may comprise a geometrical pattern, and possibly a changing geometrical pattern, that is repeated spatially. Thus, despite the variations of step of the light rays between the source and the diopter, it is possible to obtain optical characteristics, notably light ray direction characteristics, that are desired and possibly different at different points of the sealing lens.

Advantageously, the first and second optical means may be combined:

each pattern individually forming a means for spreading light rays, and/or a number of patterns collectively forming the means for spreading the light rays, in that different patterns deflect light rays parallel to the first direction in different directions around the second direction.

Thus, the number of parts of the optical system can be limited. In fact there is no need to provide specific means for spreading the beams after their deflection, this spreading function being ensured by all of the deflection means, these deflection means deflecting the light rays in different directions around a global direction.

A first diopter can be produced by the internal face of a sealing lens sealing a module containing the light source and/or a second diopter can be produced by the external face of the sealing lens. Likewise, in such an embodiment, the number of parts of the optical system can be limited.

Preferably, the light source is an organic light-emitting diode. In practice, this technology is now widely used and its cost is decreasing.

Preferably, the light source has a strong emission directivity in the direction perpendicular to its emitting surface, compared to the Lambertian light-emitting diodes. Thus, without increasing the emittance of the light source, the luminance in a given direction can be greatly increased, for example by a factor of 10. Advantageously, the light source has a luminance of at least 5000 Cd/m$^2$, preferably of at least 10 000 Cd/m$^2$. There are now OLEDs that include means conferring upon them this directivity and this luminance. For example, it is possible to use OLEDs such as those described in the patent FR2926677, which is equivalent to U.S. Patent Publication 2011/0079772, which is incorporated herein by reference and made a part hereof.

For example, the strong directivity of the surface light source is characterized by the fact that the light intensity law of this source as a function of the emission angle, θ, is a law of the type:

$$\cos(\theta)^n;$$

n being a power ranging between 10 and 20.

The expression "of the cos(θ)^n type" should be understood to mean a function of the emission angle θ, evolving in the same way as the function cos(θ)^n.

The first optical means may comprise one or more diopters. Similarly, the second optical means may comprise one or more diopters. For example, it is possible to have a single screen, of which one of the faces comprises relief patterns constituting first optical means with a diopter, and the other face comprises relief patterns constituting second optical means with a diopter. It is also possible to have two screens, the first screen comprising relief patterns constituting first optical means with two diopters, and the second screen comprising relief patterns constituting second optical means with two diopters. Thus, the different optical means can be produced simply.

According to a variant embodiment, the emission area of the surface light source is greater than 1 cm$^2$. To improve the visibility of the function, this surface may be greater than 10 cm$^2$.

Preferentially, according to the invention, the surface light source has a surface area greater than or equal to that of the surface of a relief pattern. For example, the surface source may have a surface area greater by a given percentage than that of the surface of a relief pattern described in the present application. This percentage may, for example, be at least 10%, 20%, 50%, 75%. Also preferentially, the surface area of the surface source is at least twice that of one of these relief patterns.

The distance between the emission surface of the surface light source and the first optical means and/or the second optical means is, at least locally, at least 1 millimeter, or even at least 3 millimeters (3 mm), preferentially at least 1 centimeter (1 cm). Also preferentially, this distance is, at least locally, at most 40 cm, preferentially at most 10 cm. This enables the optical means to follow the curved shapes of the sealing lens of the optical device of a motor vehicle according to the invention, notably when it is a lighting device, such as a headlight, and/or a signaling device.

Alternatively, in another embodiment, the first optical means may comprise a diffractive screen and/or the second optical means may comprise a diffractive screen.

In one embodiment of the optical device for a motor vehicle according to the invention, the rays deflected in the second direction make it possible to carry out a signaling function such as a nighttime vehicle position signaling function, a daytime vehicle position signaling function, also called DRL (daytime running light) function, a turn signaling function, a reversing signaling function, a braking indication, a fog position signaling function.

According to a variant embodiment, the optical device for a motor vehicle according to the invention makes it possible, for example, to provide a road lighting function, such as a high beam function, a low beam function, a fog beam function.

According to a variant embodiment, the optical device for a motor vehicle according to the invention makes it possible, for example, to provide a passenger compartment lighting function.

According to a variant of the invention, the optical device for a motor vehicle according to the invention is arranged to produce interior decorative light in the passenger compartment of the vehicle.

The surface source may comprise a number of surface elements emitting light, notably a number of organic light-emitting diodes. Thus, it is possible to more finely follow the curve of a sealing lens of a lighting and/or signaling device.

The surface light source preferably comprises an organic light-emitting diode (OLED). As a variant, the surface light source may comprise a lamp or an LED (namely a light-emitting diode provided with a photoemissive element of small dimensions) associated with an optical diffuser, this lamp or this LED being placed behind the optical diffuser arranged to diffuse the light from this lamp or this LED.

Another subject of the invention is a motor vehicle comprising an optical device defined previously.

These and other objects and advantages of the invention will be apparent from the following description, the accompanying drawings and the appended claims.

The appended drawings represent, by way of examples, various embodiments of an optical device for a motor vehicle according to the invention.

DETAILED DESCRIPTION OF THE PREFERRED EMBODIMENTS

The principle of the invention is to use, in an optical device of a motor vehicle, a surface light source, for example an organic light-emitting diode that exhibits, in particular, a strong directivity and a strong luminance perpendicularly to its surface, and to associate it with an optical system placed at a distance from the source. The optical system has the function of globally deflecting the light rays emitted by the light-emitting diode, which makes it possible to position the diode in a position that is not necessarily perpendicular to the desired direction of the useful light rays for the optical device for a motor vehicle. Preferably, it also has the function of spreading the light rays in order to give the impression that the light source is situated on the optical system itself and not upstream thereof.

Thus, a ray from the surface light source and oriented perpendicularly to the surface of this source is deflected by the optical system to be directed out of the motor vehicle optical device in a chosen direction, for example parallel to the longitudinal axis of the motor vehicle.

The principle of an optical device 1 for a motor vehicle is also described hereinbelow with reference to FIG. 1.

Figure 1:
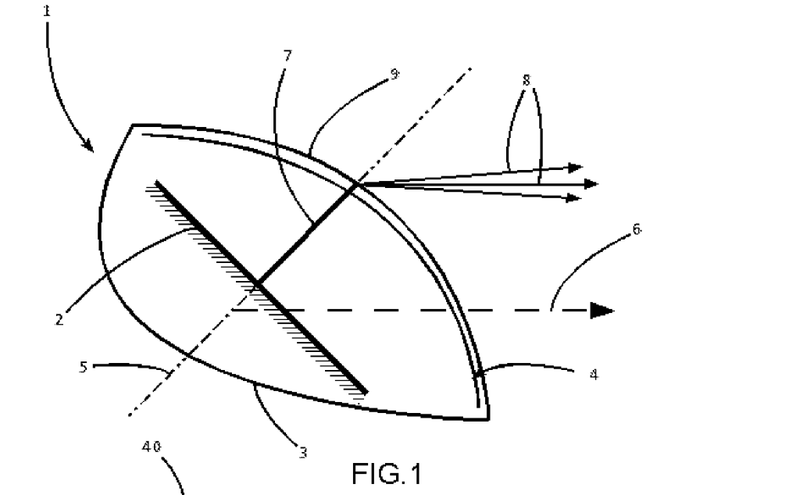
FIG. 1 is a schematic diagram in cross section of an optical device for a motor vehicle according to the invention.

The vehicle optical device illustrated in FIG. 1 corresponds to lighting and/or signaling. As seen previously, this is not limiting, the optical device for a motor vehicle according to the invention being also able, for example, to be a device inside the passenger compartment. The lighting and/or signaling device mainly comprises:

a sealed enclosure, formed by a module 3 and a sealing lens 9, a surface light source 2, and an optical system 4.

According to the principle of the invention, in the optical device 1 for a motor vehicle, the optical system 4 is positioned, at least locally, at a distance from the surface light source 2.

When the surface light source 2 is active, it emits a beam of rays 7 mainly in a first direction 5, for example perpendicular to the surface of the source. This beam of rays 7 is deflected and, possibly, shaped by the optical system 4. The rays 8 that are thus obtained leave the lighting and/or signaling device 1 through the sealing lens 9 and thus provide the lighting and/or signaling function. Preferably, the rays 8 leaving the lighting and/or signaling device 1 are globally parallel to a second direction 6 chosen according to the lighting and/or signaling function provided. Depending on the lighting and/or signaling function provided, the beam formed by the rays 8 may exhibit a greater or lesser spreading, that is to say that these rays 8 are inscribed in a cone having an axis parallel to the second direction 6 and having a greater or lesser angle at the apex, this angle corresponding to the spreading. Moreover, this cone is not necessarily of revolution. In practice, for many lighting and/or signaling functions, it is advantageous for the section of this cone perpendicularly to the second direction 6 to have a height less than its width.

Preferably, the optical system 4 extends over the entire surface facing the surface light source 2 in relation to the main direction of light emission from the surface source. Thus, each light ray or at least most of the light rays emitted by the surface light source 2 in the main emission direction are deflected by the optical system 4 so that they leave the lighting and/or signaling device 1 while being inscribed in cones identical to the one mentioned previously, the apexes of the cones coinciding with the points of output of the rays from the lighting and/or signalling device 1.

According to a variant embodiment, the first direction 5 and the second direction 6 may form an angle greater than 1°, preferentially greater than 4°. Preferentially, this angle is between 5 and 50°. For example, this angle can be chosen from the following values: 5°, 10°, 20°, 30°, 45°.

Figure 2:
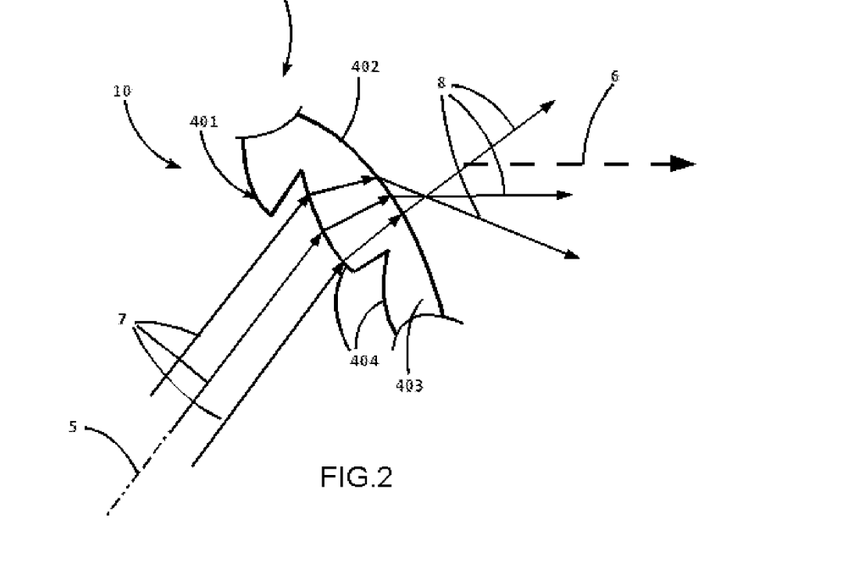
FIG. 2 is a partial cross-sectional diagram of a first embodiment of an optical device for a motor vehicle according to the invention.

In a first embodiment 10 of the optical device for a motor vehicle partially represented in FIG. 2, the sealing lens 403 constitutes the optical system 40. In practice, the latter has, on its internal face, a relief pattern 404 that is repeated spatially. This internal face forms a first diopter 401. Since the surface of the pattern is not arranged perpendicularly to the first direction 5 and is not planar, it deflects the light rays 7 by forming a convergent beam. The rays that are thus obtained then leave the lens at its external face forming a second diopter 402 which once again deflects the light rays, accentuating their convergence. The outgoing rays 8 cross at a short distance in front of the lens 403, and therefore diverge after having crossed. By virtue of the arrangement of these diopters, rays will be obtained for which the average of the directions is approximately parallel to the second direction 6, the directions of the rays being distributed about this second direction 6. Thus, the light beam resulting from these outgoing rays 8 is globally parallel to the second direction 6, and exhibits a spreading about this second direction 6. In this first embodiment, first optical deflection means deflecting the light rays emitted in the first direction 5 comprise the diopters 401 and 402. Similarly, in this first embodiment, second optical means spreading the light rays comprise the diopters 401 and 402. The terms "first" and "second" have only one distinctive meaning. They have no spatial or temporal meaning.

Figure 3:
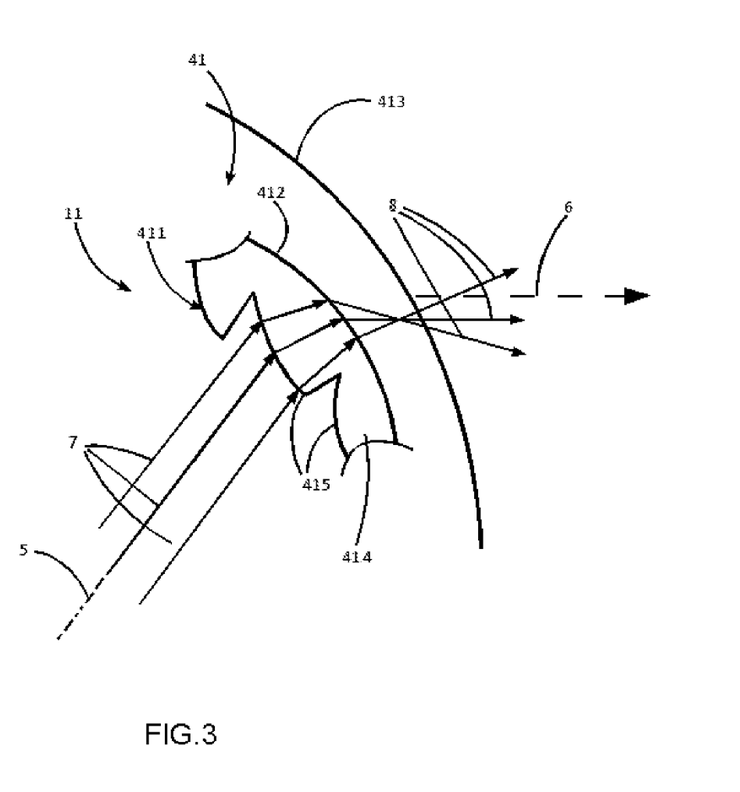
FIG. 3 is a partial cross-sectional diagram of a second embodiment of an optical device for a motor vehicle according to the invention.

In a second embodiment 11 of the optical device for a motor vehicle partially represented in FIG. 3, a sealing lens 413 seals the enclosure downstream of an optical system 41. In this second embodiment, this sealing lens 413 has no relief patterns with which to deflect the light rays. The optical system 41 comprises an element 414 made of transparent material that has, on its internal face, a relief pattern 415 that is repeated spatially. This internal face forms a first diopter 411. Since the surface of the pattern is not arranged perpendicularly to the first direction 5 and is not planar, it deflects the light rays 7 by forming a convergent beam. Thus, between the input and the output of the optical system 41, the light beams are deflected, that is to say that their global direction has changed, and their forms are modified, that is to say that the angle of the cone in which their light rays are inscribed is modified. The rays that are thus obtained then leave the transparent element at its external face forming a second diopter 412 once again deflecting the light rays while accentuating their convergence. The light rays then leave the device by passing through the sealing lens 413 without being substantially deflected. The outgoing rays 8 cross at a short distance in front of the sealing lens 413, and therefore diverge after having crossed. By virtue of the arrangement of these diopters 411 and 412, rays will be obtained for which the average of the directions is approximately parallel to the second direction 6, the directions of the rays being distributed about this second direction. Thus, the light beam resulting from these outgoing rays 8 is globally parallel to the second direction 6, and exhibits a spreading about this second direction 6. In this second embodiment, first optical deflection means deflecting the light rays emitted in the first direction 5 comprise the diopters 411 and 412. Similarly, in this second embodiment, second optical means for spreading the light rays comprise the diopters 411 and 412. This embodiment makes it possible for the optical system 41 to have a shape that is different from the sealing lens 413 of the device. Thus, the optical system 41 can more easily be molded and it is possible to obtain a depth effect by virtue of the way the optical system 41 is set back relative to the sealing lens 413.

Figure 4:
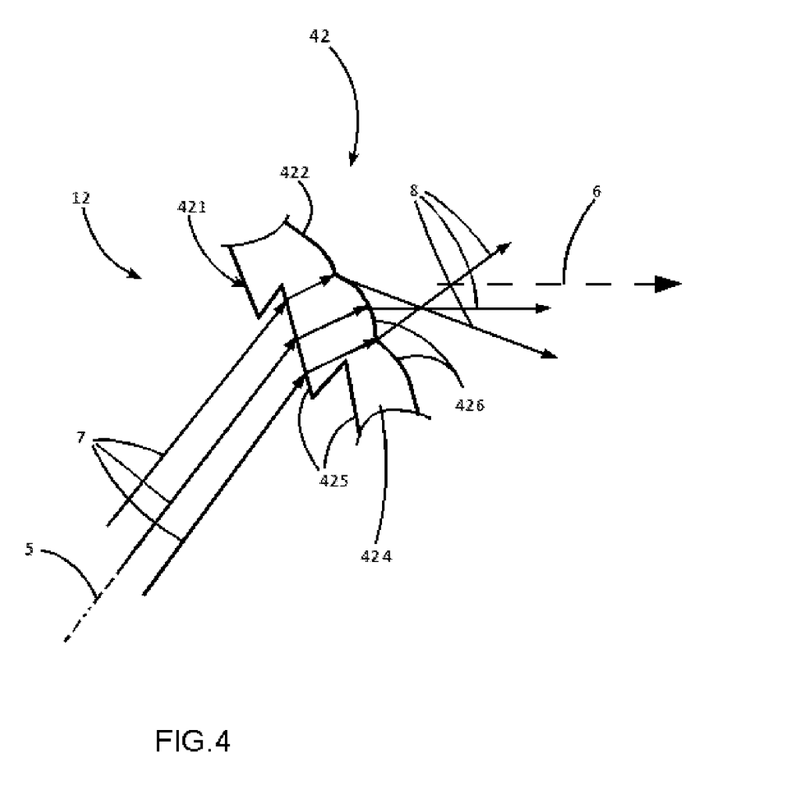
FIG. 4 is a partial cross-sectional diagram of a third embodiment of an optical device for a motor vehicle according to the invention.

In a third embodiment 12 of the optical device for a motor vehicle partially represented in FIG. 4, the sealing lens 424 constitutes the optical system 42. In practice, the latter has, on its internal face, a relief pattern 425 that is repeated spatially, for example flat prisms. This internal face forms a first diopter 421. Since the surface of the pattern is not arranged perpendicularly to the first direction 5, it deflects the light rays 7. In the example illustrated in FIG. 4, since the relief pattern 425 of the internal face is a flat prism, the parallel rays remain parallel after deflection. The sealing lens 424 also has, on its external face, a relief pattern 426 that is repeated spatially. This external face forms a second diopter 422. Since the surface of the pattern is not planar, it deflects the light rays 7 by forming a convergent beam. The outgoing rays 8 cross at a short distance in front of the lens 423, and therefore diverge after having crossed. By virtue of the arrangement of these diopters 421, 422, rays will be obtained for which the average of the directions is approximately parallel to the second direction 6, the directions of the rays being distributed about this second direction 6. Thus, the light beam resulting from these outgoing rays 8 is globally parallel to the second direction 6, and exhibits a spreading about this second direction 6. In this third embodiment, first optical deflection means deflecting the light rays emitted in the first direction 5 comprise the diopters 421 and 422. Similarly, in this third embodiment, second optical means for spreading the light rays comprise the diopters 421 and 422. This embodiment makes it possible to separate the deflection and spreading functions on different diopters. Thus, the design and production, notably the molding, of the optical system 42 are simplified.

Figure 5:
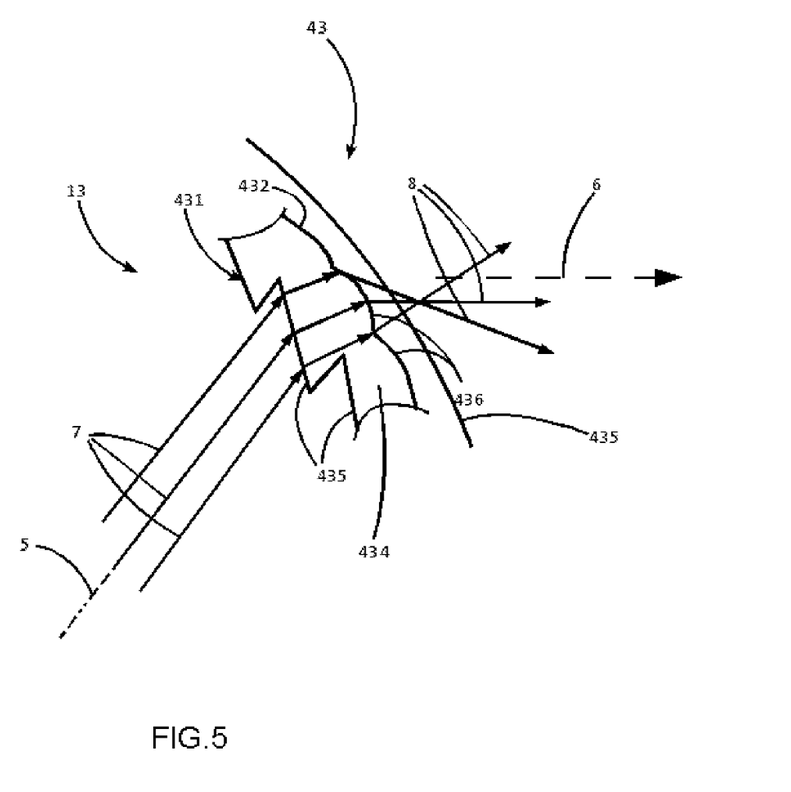
FIG. 5 is a partial cross-sectional diagram of a fourth embodiment of an optical device for a motor vehicle according to the invention.

In a fourth embodiment 13 of the optical device for a motor vehicle partially represented in FIG. 5, a sealing lens 433 seals the enclosure downstream of an optical system 43. The optical system 43 comprises an element 434 made of transparent material that has, on its internal face, a relief pattern 435 that is repeated spatially, for example flat prisms. This internal face forms a first diopter 431. Since the surface of the pattern is not arranged perpendicularly to the first direction 5, it deflects the light rays 7. In the example illustrated in FIG. 4, since the relief pattern 435 of the internal face is a flat prism, the parallel rays remain parallel after deflection. The rays that are thus obtained then leave the transparent element at its external face that has a relief pattern 436 that is repeated spatially. This external face forms a second diopter 432. Since the surface of the pattern is not planar, it deflects the light rays 7 by forming a convergent beam. The light rays then leave the device by passing through the sealing lens 435. The outgoing rays 8 cross at a short distance in front of the sealing lens 433, and therefore diverge after having crossed. By virtue of the arrangement of these diopters 431, 432, rays will be obtained for which the average of the directions is approximately parallel to the second direction 6, the directions of the rays being distributed about this second direction 6. Thus, the light beam resulting from these outgoing rays 8 is globally parallel to the second direction 6, and exhibits a spreading about this second direction 6. In this fourth embodiment, first optical deflection means deflecting the light rays emitted in the first direction 5 comprise the diopters 431 and 432. Similarly, in this fourth embodiment, second optical means for spreading the light rays comprise the diopters 431 and 432. This embodiment makes it possible to avoid the fouling of the optical system 43 by dust coming from outside and being trapped in the concave areas of the screen. Thus, the photometric efficiency is guaranteed in all circumstances.

As an alternative to the various embodiments described and represented in FIGS. 2 to 5, it is also possible to give different forms to the diopters in order for the second optical means to directly cause the light rays to diverge, in such a way that the light beam resulting from the outgoing rays is globally parallel to the second direction and exhibits a spreading about this second direction 6, directly at the output of the optical system.

Figure 6:
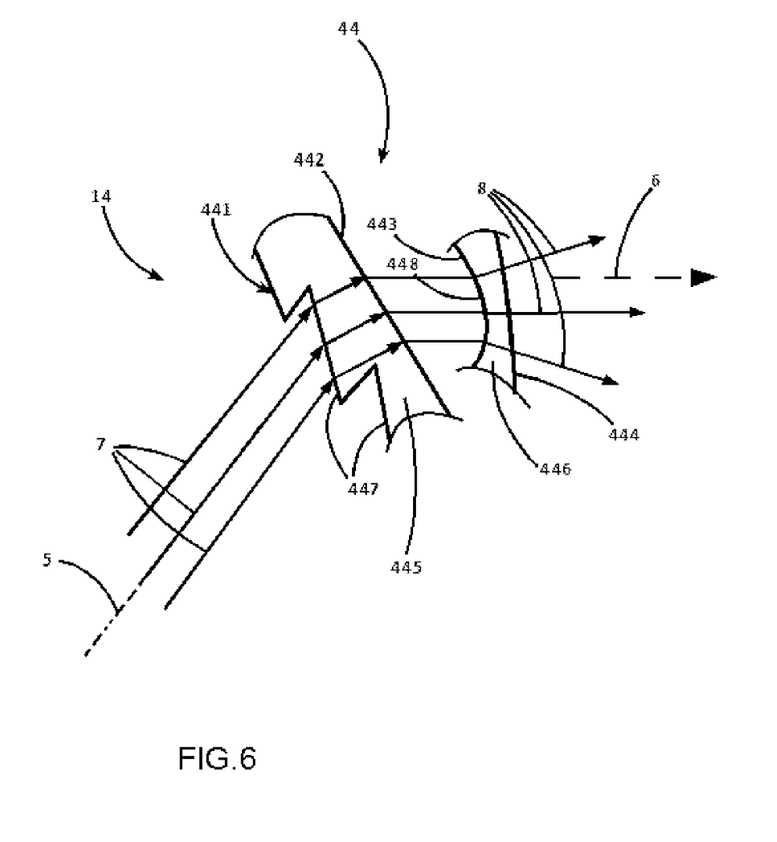
FIG. 6 is a partial cross-sectional diagram of a fifth embodiment of an optical device for a motor vehicle according to the invention.

In a fifth embodiment 14 of the optical device for a motor vehicle partially represented in FIG. 6, the sealing lens 446 constitutes an element of the optical system 44. Upstream of the sealing lens 446 there is a first element 445 of the optical system 44. This first element 445 is made of a transparent material. It comprises, on its internal face, a relief pattern 447 that is repeated spatially. This internal face forms a first diopter 441. Since the surface of the pattern is not perpendicular to the rays 7, it deflects the light rays. The light rays are then once again deflected by the external face of the first element which forms a second diopter 442. The sealing lens 446 has, on its internal face, a relief pattern 448 that is repeated spatially. This internal face forms a third diopter 443. Since the surface of the pattern is not planar, it spreads the light rays by forming a divergent beam. The rays that are thus obtained then leave the lens at its external face forming a fourth diopter 444 once again deflecting the light rays. Thus, the rays 8 of the light beam that are finally obtained are globally parallel to the second direction 6. In this fifth embodiment, first optical deflection means deflecting the light rays emitted in the first direction 5 comprise the diopters 441 and 442. Similarly, in this fifth embodiment, second optical means for spreading the light rays comprise the diopters 443 and 444. This embodiment makes it possible to separate the deflection and spreading functions. The more or less free positioning of the diopter 445 relative to the diopter 446 makes it possible to create a depth effect.

Figure 7:
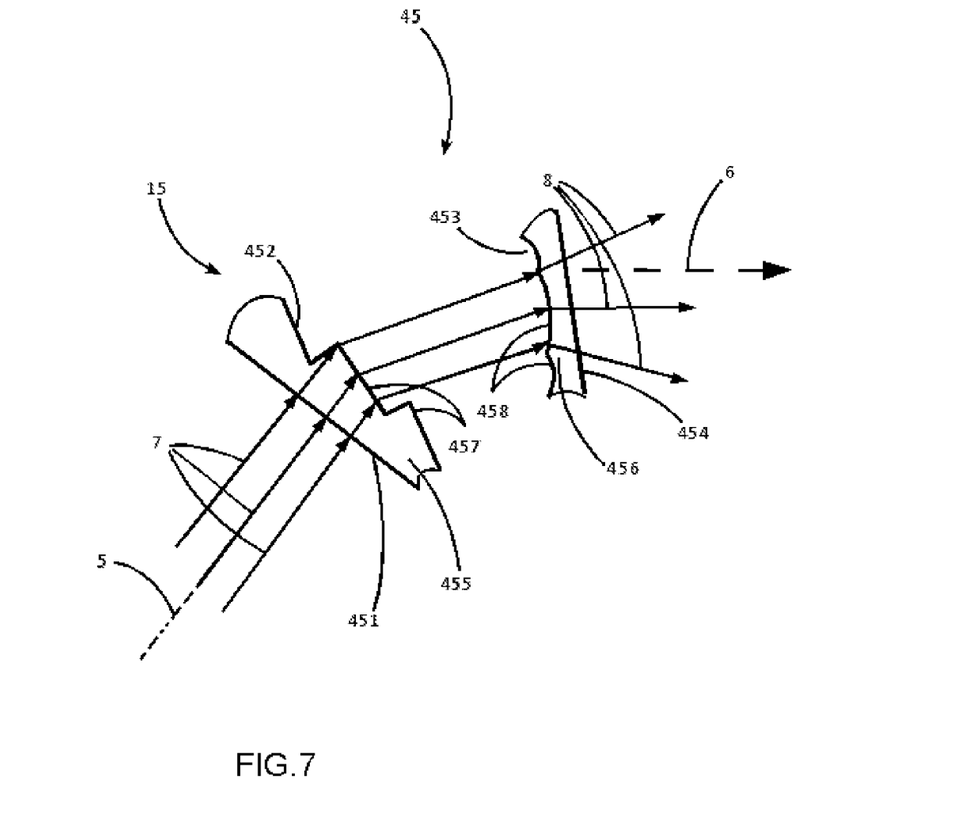
FIG. 7 is a partial cross-sectional diagram of a sixth embodiment of an optical device for a motor vehicle according to the invention.

In a sixth embodiment 15 of the optical device for a motor vehicle partially represented in FIG. 7, the sealing lens 456 constitutes an element of the optical system 45. Upstream of the sealing lens 456 there is a first element 455 of the optical system 45. This first element 455 is made of a transparent material. It comprises a smooth internal face forming a first diopter 451 and, on its external face, a relief pattern 457 that is repeated spatially. This external face forms a second diopter 452. This diopter deflects the light rays. The sealing lens 456 has, on its internal face, a relief pattern 458 that is repeated spatially. This internal face forms a third diopter 453. Since the surface of the pattern is not planar, it spreads the light rays by forming a divergent beam. The rays that are thus obtained then leave the lens at its external face forming a fourth diopter 454 once again deflecting the light rays. Thus, the rays 8 of the light beam that are finally obtained are globally parallel to the second direction 6. In this sixth embodiment, first optical deflection means deflecting the light rays emitted in the first direction 5 comprise the diopters 451 and 452. Similarly, in this sixth embodiment, second optical means for spreading the light rays comprise the diopters 453 and 454. This embodiment is particularly advantageous because it offers a good efficiency by limiting the losses by reflection of the light rays on the diopters.

Figure 8:
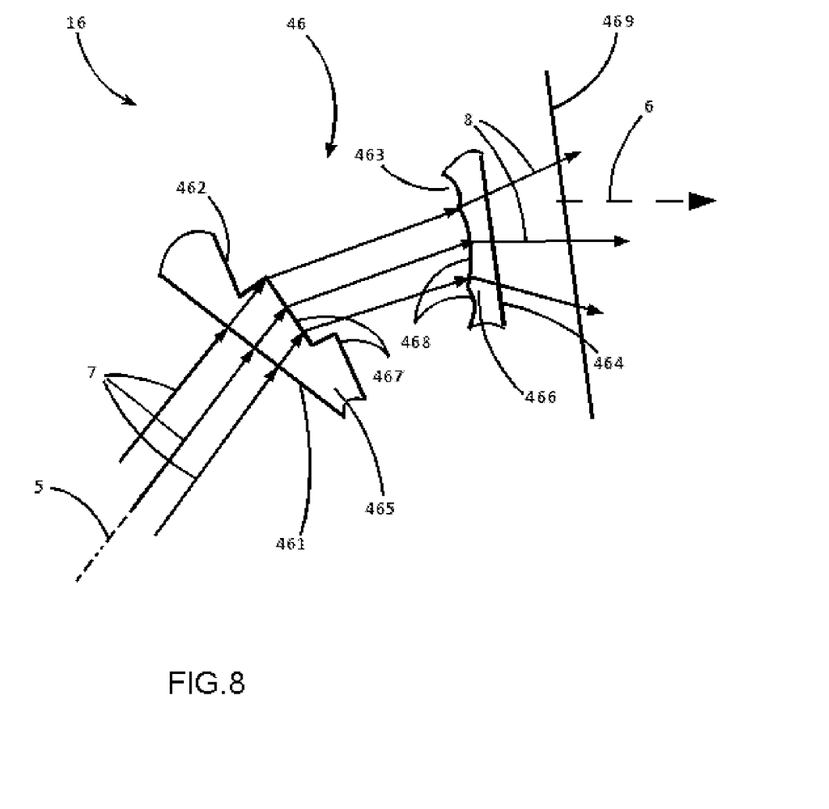
FIG. 8 is a partial cross-sectional diagram of a seventh embodiment of an optical device for a motor vehicle according to the invention.

In a seventh embodiment 16 of the optical device for a motor vehicle partially represented in FIG. 8, the sealing lens 467 is arranged downstream of the optical system 46. The optical system 46 comprises a first element 465 and a second element 466. These elements 465, 466 are made of a transparent material. The first element 465 comprises a smooth internal face forming a first diopter 461 and, on its external face, a relief pattern 467 that is repeated spatially. This external face forms a second diopter 462. This diopter deflects the light rays. In this embodiment, the diopters 461 and 462 form prisms. The second element 466 has, on its internal face, a relief pattern 468 that is repeated spatially. This internal face forms a third diopter 463. Since the surface of the pattern is not planar, it spreads the light rays by forming a divergent beam. The rays that are thus obtained then leave the second element at its external face forming a fourth diopter 464 once again deflecting the light rays. The light rays then leave the device through the sealing lens 469. Thus, the rays 8 of the light beam that are finally obtained are globally parallel to the second direction 6. In this seventh embodiment, first optical deflection means deflecting the light rays emitted in the first direction 5 comprise the diopters 461 and 462. Similarly, in this seventh embodiment, second optical means for spreading the light rays comprise the diopters 463 and 464.

In the embodiments described previously and in which a geometrical pattern is repeated spatially in the optical system, this geometrical pattern may be a changing pattern, that is to say that its optical characteristics change progressively depending on its position in the optical system. Thus, despite the step variations of the light rays between the source and the diopter, it is possible to obtain optical characteristics, notably light ray direction characteristics, that are desired and possibly different at different points of the sealing lens.

The patterns 463, 453 and 443 may also be convergent, so as to cause the rays to converge at a short distance, which makes it possible to spread the beam in a manner similar to that obtained with the divergent patterns that are observed at a distance.

Figure 9:
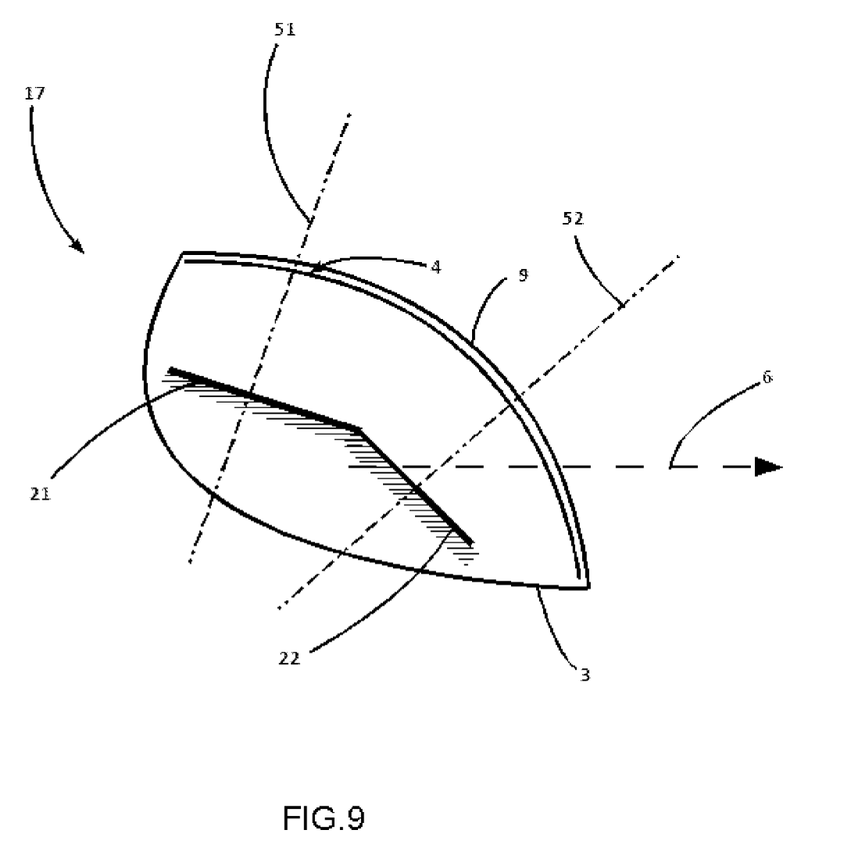
FIG. 9 is a partial cross-sectional diagram of an eighth embodiment of an optical device for a motor vehicle according to the invention.

In another embodiment 17 represented in FIG. 9, the optical device for a motor vehicle comprises two surface light sources 21, 22. These two surface light sources 21, 22 can be arranged side-by-side. They can emit light mainly in two distinct directions 51, 52. The optical system 4 makes it possible to deflect and shape the beams of light rays emitted by each of the two surface light sources 21, 22. The beams of light rays that are thus obtained may be globally oriented in the same second direction 6. Alternatively, the light beams from the first source 21 may be deflected globally in a first direction 5 and the light beams from the second source 22 may be deflected globally in a second direction 6, these first and second directions 5, 6 being distinct.

The part of the optical system 4 facing the first light source 21 can have optical characteristics that are different from the part of the optical system 4 facing the second light source 22. Preferably, in such a case, the variations of characteristics can be progressive to avoid any sudden variation of appearance of the motor vehicle optic. As can be seen in this example represented in FIG. 9, by taking two light sources emitting perpendicularly to their surface, it is possible to arrange them, contiguously or not, by orienting their plane of emission differently. The optical system 4 will make it possible to confer the desired global direction on the beam from each independent source. It is thus possible to overcome the constraints of orientation of the surface source. Surface sources can thus be arranged according to the design of the optical device for a motor vehicle according to the invention, and particularly when it is a lighting and/or signaling device, for example to follow its curve. The optical system 4 will then be adapted to confer the global direction and the desired spreading of the light beams. Such an embodiment also makes it possible to give an appearance when off that is different to the appearance when on, the surface of the surface source, for example the organic light-emitting diode, not being perceived in the same way depending on whether it is on or off, especially when it emits in a strongly directed manner. This last embodiment can obviously be combined with the other embodiments described previously.

Advantageously, the first and second light sources emit light of different colors and can be activated independently of one another. Thus, the optical device for a motor vehicle can provide a number of functions, notably a number of functions requiring different colors, the device nevertheless having a uniform appearance from outside the sealing lens when the light sources are off. For example, the device may provide both a rear position signaling function and a turn signaling function.

Such an optical device for a motor vehicle according to the invention may also have more than two surface light sources, for example to produce more than two functions or better follow the curve, notably in the case of a lighting and/or signaling device.

Figure 11:
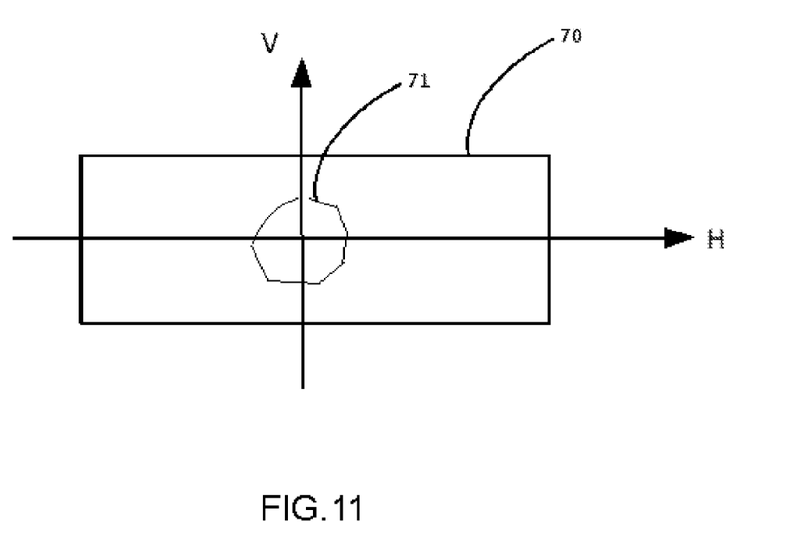
FIG. 11 is a graph representing a light beam spreading figure obtained by a first spreading method.

As explained previously, in a number of motor vehicle lighting applications, it is advantageous to spread the light rays. In particular, it is often advantageous to have a greater spreading of the light rays on a horizontal axis than on a vertical axis. An example of diffusion figure or of spreading figure is represented in FIG. 11. This example of figure is schematically represented in rectangular form 70, but the figure can have any other form. This FIG. 11 corresponds to a screen onto which is projected the light beam from the lighting and/or signaling device. This screen is, in principle, vertical, the axis V corresponding to the vertical axis and the axis H to the horizon. By virtue of the various embodiments of optical systems described previously, from a light beam whose section 71 is represented in FIG. 11, there is obtained, at a determined distance, for example at 10 or at 25 meters, from the lighting and/or signaling device, the rectangular form 70. In these embodiments, each light beam, however individual it may be, notably each light beam impacting on all of an individual pattern of a first diopter providing a spreading function, is spread.

Figure 12:
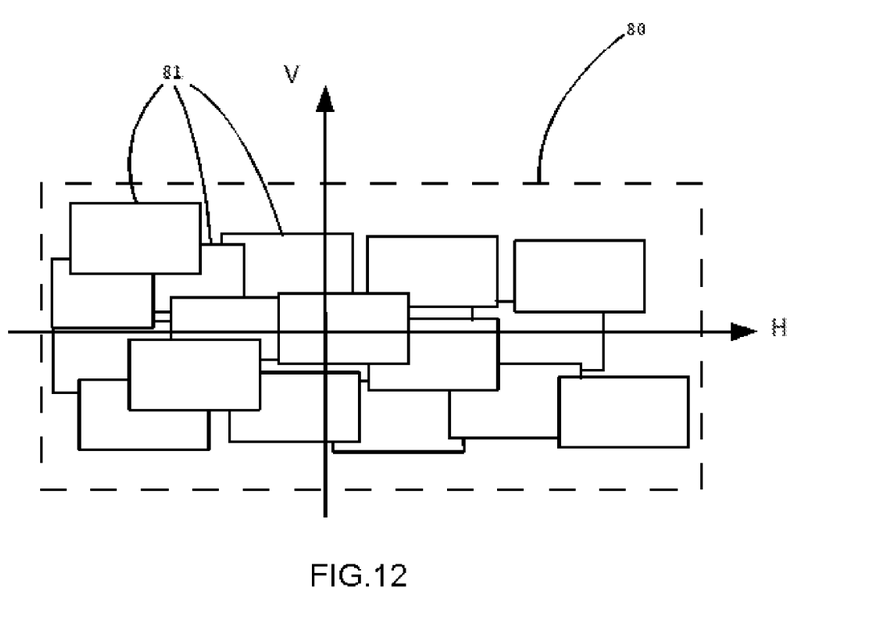
FIG. 12 is a graph representing a light beam spreading figure obtained by a second spreading method.

In another embodiment of the optical device for a motor vehicle, the same spreading effect is obtained differently as represented in FIG. 12. In fact, there is not spreading of each individual beam. The spreading function is obtained by deflections of the individual beams in different directions about the second direction 6. There are therefore, strictly speaking, only light ray deflection means, the light ray spreading means consisting of all the deflection means. An example of diffusion figure or of spreading figure is represented in FIG. 12. This example of a figure is schematically represented in rectangular form 80, but the figure may have any other form. In this embodiment, an individual light beam, notably a light beam impacting on all of an individual pattern of a first diopter providing a spreading function, is not spread. Thus, from a light beam impacting on a set of individual patterns of a diopter of the optical system, a set of light beams (the rectangular form 80 of which is represented in FIG. 12) from the individual patterns is obtained, all oriented in different directions. The incomplete and staggered superposition of the different light spots distributed over all of the spreading area of the rectangular form 80 makes it possible to generate the global beam.

Alternatively, it is possible to use the two principles described previously in a complementary way. In practice, it is possible to provide the spreading function by virtue of the combined effect of individual patterns that have a spreading function and that are arranged in such a way that they do not all emit the light in one and the same direction.

Figure 10:
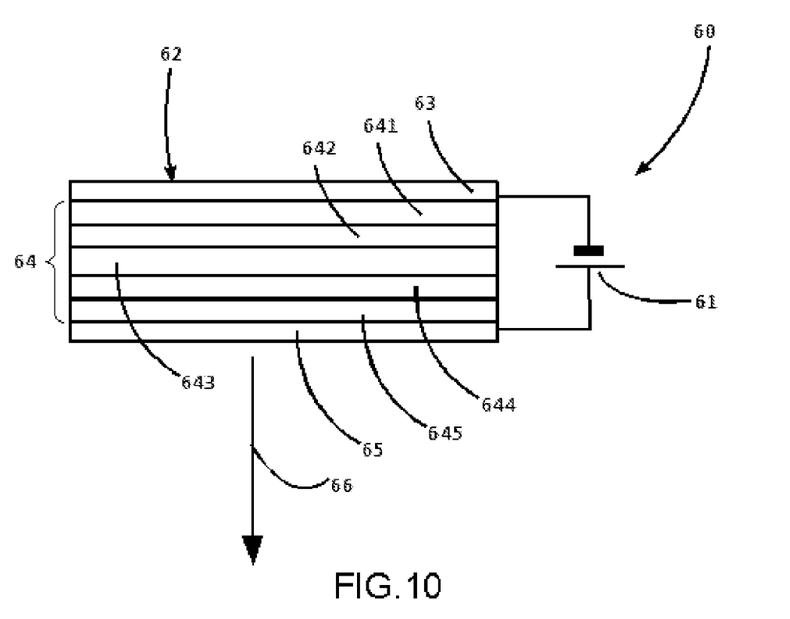
FIG. 10 is a cross-sectional diagram of an organic light-emitting diode.

The surface light source or sources may be of any types. Nevertheless, the light sources of organic light-emitting diode type are preferred. Such an organic light-emitting diode device 60 is represented in FIG. 10. The organic light-emitting diode device 60 comprises an organic light-emitting diode 62 and an electrical voltage generator 61. The organic light-emitting diode 60 comprises a number of layers: a cathode 63, an anode 65 and an organic layer 64. When the organic layer 64 is subjected to an electrical voltage, it emits a light radiation 66 which is propagated through the anode 65 which is transparent to this radiation 66. The organic layer 64 may possibly comprise a number of strata 641 to 645 made of different organic materials. Preferably, organic light-emitting diodes are used that comprise supplementary strata. In addition to the light-emitting stratum 643, the organic layer 64 comprises a stratum 641 favoring the transfer of the electrons to the emitting stratum 643 and a stratum 645 favoring the transfer of the holes, namely the absences of electrons, to the emitting stratum 643. The organic layer 64 may also comprise a stratum 642 blocking the holes from the lower strata, 643 to 645, and a stratum 644 blocking the electrons from the higher strata 641 to 643. As a whole, these strata constitute a microcavity whose thickness is adjusted to create an optical resonance. Selective interferential reflectors are thus produced which constitute resonant cavities. For example, it is possible to use an organic light-emitting diode of the type described in the document FR 2 926 677 mentioned above, which is equivalent to U.S. Patent Publication 2011/0079772, which is incorporated herein by reference and made a part hereof.

Preferentially, the emitting area of the surface light sources is greater than 1 $cm^2$, or even greater than 10 $cm^2$.

Preferably, in the embodiments described previously, the patterns of the diopters typically have sizes of between 0.5 mm and 1 mm, or even between 0.2 mm and 5 mm, or even up to 10 mm. Thus, they can be produced using molds obtained using conventional machining means.

In an embodiment that is not represented, the optical system of the optical device for a motor vehicle may comprise one or more diffractive screens. In practice, these screens have the properties of being able to collimate, straighten or spread the light with structures with a size of the order of the light wavelength. Certain optical diffraction properties are predominant in respect to the refraction properties. For example, screens may comprise diffraction gratings comprising patterns with a size close to the wavelength that behave together as a prism whose deflection angle depends on the wavelength and the geometry of these gratings.

Figure 13:
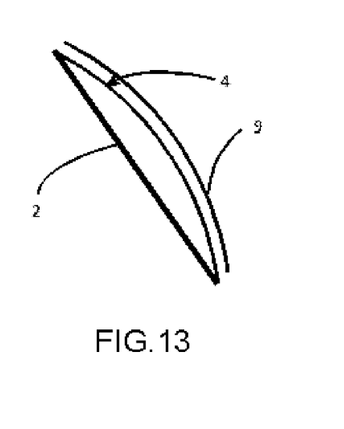
FIG. 13 is a section of an embodiment of an optical device for a motor vehicle according to the invention.
Figure 14:
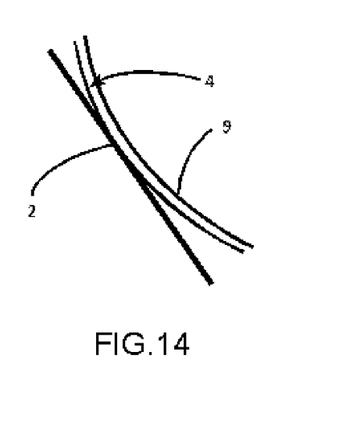
FIG. 14 is a section of an embodiment of an optical device for a motor vehicle according to the invention.

As described previously, in the optical device for a motor vehicle according to the invention, the first optical light ray deflection means are at least locally remote from the surface light source. In fact, as represented in FIG. 13, in a first configuration, the optical system 4 comprising the first optical means is curved and remote from the surface light source 2 in the central part of the section represented, even though, at the ends of the section represented, the optical system is in contact with the surface source. In a second configuration represented in FIG. 14, the optical system 4 is curved and remote from the surface light source 2 at the ends of the section represented, even though, in the central part of the section represented, the optical system 4 is in contact with the surface source.

It should be noted that, in the examples illustrated, the surface area of the surface source is equal to that of a number of relief patterns, for example three, or even more than ten. The advantage of the surface source, notably in the case of an OLED, is that it can extend over a large surface. According to the present invention, the surface light source may extend facing a number of patterns of the first optical means, or even all the patterns of the first optical means.

It will be understood that, by virtue of the optical device for a motor vehicle according to the invention, the surface light source may be planar and may not necessarily be oriented in the direction in which the light rays are supposed to be propagated out of the device. Thus, the locating of a surface light source in an optical device for a motor vehicle, and particularly in a lighting and/or signaling device, is simplified. For example, the surface light source may be positioned according to the mean curve of the sealing lens of the lighting and/or signaling device. It is thus possible to use organic light-emitting diodes with strong luminance without in any way being subject to the prohibitive positioning constraints thereof. Furthermore, the spreading effect of the optical system makes it possible to resolve the reflection problems posed by the presence of a light-emitting diode with no optical system.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An optical device for a motor vehicle, notably a signaling and/or lighting device, comprising a surface light source emitting light rays in a first direction, wherein said optical device comprises an optical system including a first optical means that are at least locally remote from said surface light source and deflecting said light rays emitted in said first direction in a second direction different from said first direction; wherein an emission surface of said surface light source is remote, at least locally, by at least 1 centimeter, from said first optical means and/or from a second optical means.

2. The optical device as claimed in claim 1, wherein said optical system comprises a second optical means for spreading said light rays.

3. The optical device as claimed in claim 1, wherein said first optical means and/or said second optical means comprise a number of diopters, so as to confer on a light beam emitted by said optical device at least one of a global direction and a spreading.

4. The optical device as claimed in claim 3, wherein one or more of said number of diopters comprise a geometrical pattern that is repeated spatially.

5. The optical device as claimed in claim 4, wherein said first and second optical means are combined:
  each pattern individually forming a means for spreading the light rays, and/or
  a number of patterns collectively forming a means for spreading the light rays in that different patterns deflect light rays parallel to said first direction in different directions around said second direction.

6. The optical device as claimed in claim 3, wherein a first diopter is produced by an internal face of a sealing lens sealing a module containing a light source and/or in that a second diopter is produced by an external face of said sealing lens.

7. The optical device as claimed in claim 1, wherein said surface light source is an organic light-emitting diode.

8. The optical device as claimed in claim 1, wherein said first optical means comprise one or more diopters.

9. The optical device as claimed in claim 1, wherein said optical system comprises second optical means spreading light rays, said second optical means comprising one or more diopters.

10. The optical device as claimed in claim 1, wherein an emission area of said surface light source is greater than 1 $cm^2$.

11. The optical device as claimed in one claim 1, wherein said surface light source exhibits a strong emission directivity in a direction perpendicular to its emitting surface, compared to the Lambertian light-emitting diodes.

12. The optical device as claimed in claim 1, wherein said surface light source has a luminance of at least 5000 $Cd/m^2$.

13. The optical device as claimed in claim 2, wherein an emission surface of said surface light source is remote, at least locally, by at least 1 mm, or even at least 3 millimeters, from said first optical means and/or from said second optical means.

14. The optical device as claimed in claim 2, wherein said first optical means comprise a diffractive screen and/or in that said second optical means comprise a diffractive screen.

15. The optical device as claimed in claim 1, wherein said optical device is a signaling light.

16. The optical device as claimed in claim 1, wherein said surface light source comprises a number of surface elements emitting light, notably a number of organic light-emitting diodes.

17. An optical device for a motor vehicle comprising:
  a surface light source emitting light rays in a first direction;
  an optical system having a first optical device at least locally remote from said surface light source and deflecting said light rays emitted in said first direction in a second direction different from said first direction; wherein an emission surface of said surface light source is remote, at least locally, by at least 1 centimeter, from a first optical means and/or from a second optical means.

18. The optical device as claimed in claim 2, wherein said first optical means and/or said second optical means comprise a number of diopters, so as to confer on a light beam emitted by said optical device at least one of a global direction and a spreading.

19. The optical device as claimed in claim 2, wherein one or more of a number of diopters comprise a geometrical pattern that is repeated spatially.

20. The optical device as claimed in claim 19, wherein one or more of said number of diopters comprise a changing geometrical pattern that is repeated spatially.

* * * * *